Aug. 7, 1928.                                                    1,679,671
J. KLAMER
ILLUMINATED CITY NAME AND LICENSE DOUBLE NUMBER PLATE
AND DIRECTION SIGNAL ATTACHMENT THEREFOR
Filed May 27, 1927           2 Sheets-Sheet 1
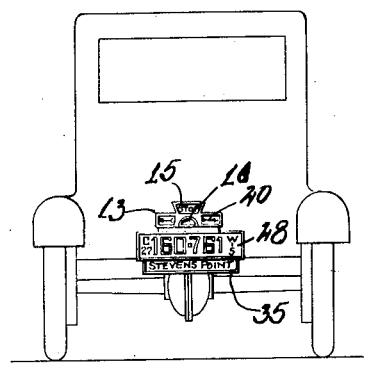
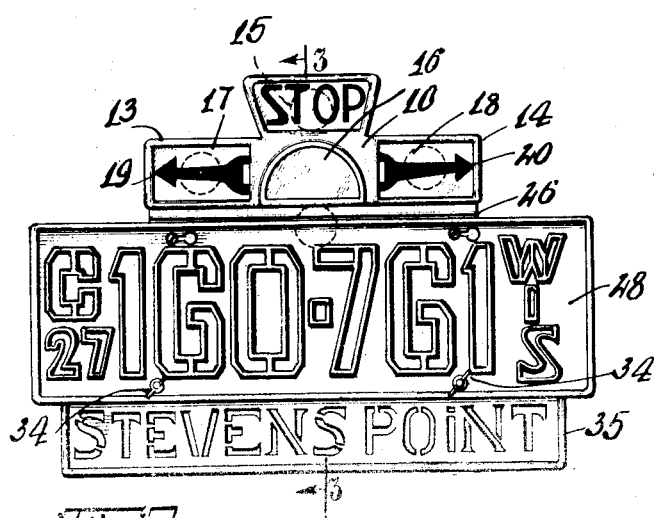
INVENTOR
John Klamer
BY
Zoltan Holachek
ATTORNEY Aug. 7, 1928. 1,679,671
J. KLAMER
ILLUMINATED CITY NAME AND LICENSE DOUBLE NUMBER PLATE
AND DIRECTION SIGNAL ATTACHMENT THEREFOR
Filed May 27, 1927 2 Sheets-Sheet 2
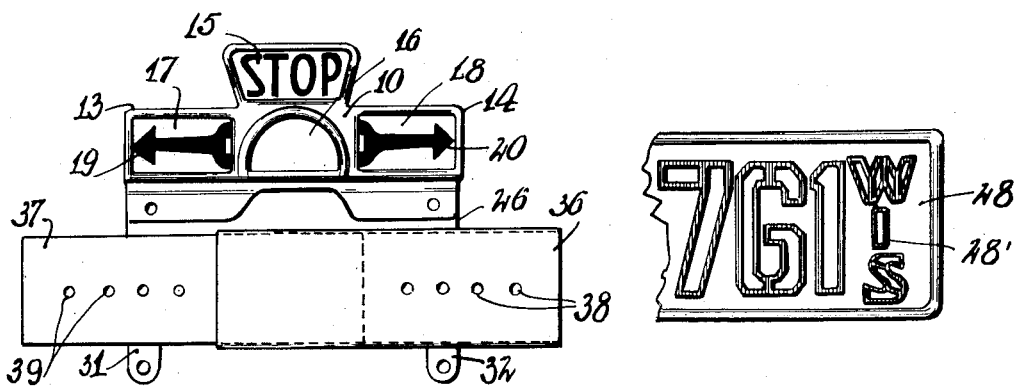
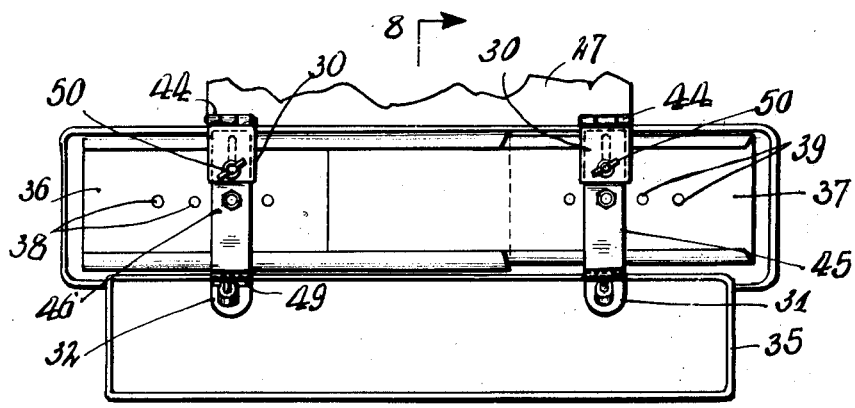
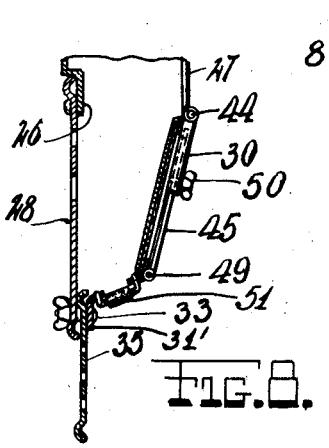
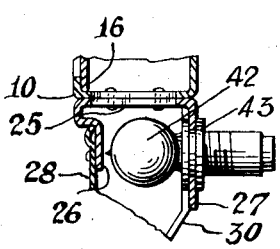
INVENTOR
John Klamer
BY
ATTORNEY Patented Aug. 7, 1928.

1,679,671

UNITED STATES PATENT OFFICE.

JOHN KLAMER, OF STEVENS POINT, WISCONSIN.

ILLUMINATED CITY NAME AND LICENSE DOUBLE-NUMBER PLATE AND DIRECTION-SIGNAL ATTACHMENT THEREFOR.

Application filed May 27, 1927. Serial No. 194,655.

This invention relates to a new and useful device in the nature of a combination license plate holder, rear light and direction signal, particularly adapted for use in connection with motor vehicles for the purpose of holding a license plate and illuminating the said plate, and indicating to following vehicles when the driver of the vehicle to which same is attached intends to stop or turn.

The object of the invention is to provide a combination license plate holder, rear light and direction signal device of novel construction and arrangement of parts, hereinafter more fully described, claimed and illustrated in the accompanying drawing.

Fig. 1 is a rear view of a motor vehicle with my improved device attached thereto.

Fig. 2 is an enlarged front elevational view of my improved device.

Fig. 3 is a vertical sectional view taken on the line 3—3 of Fig. 2.

Fig. 4 is a rear elevational view thereof.

Fig. 5 is a front elevational view, similar to that shown in Fig. 2 showing the license plate and identification plate removed.

Fig. 6 is an enlarged view illustrating a modification of the license plate.

Fig. 7 is a fragmentary rear elevational view illustrating a modification thereof.

Fig. 8 is a sectional view, taken on the line 8—8 of Fig. 7.

Fig. 9 is an enlarged detail view of a portion of Fig. 3, in the vicinity of the lowermost lamp.

As here embodied my improved device comprises a casing 10, divided into separate chambers by means of walls extending from the front to the back of the casing 10. The above described construction is such as will provide an upper chamber 11, a lower chamber 12, and side chambers 13 and 14. Translucent front members 15, 16, 17, and 18 are mounted in the chambers 11, 12, 13, and 14 respectively. The translucent member 15 having affixed thereto the word "Stop", the translucent members 17 and 18 having affixed thereto designating arrows 19 and 20, pointing to the left and to the right respectively. The electric light sockets 21, 43, 23, 24 are secured to the rear portions of the chambers 11, 12, 13, and 14, respectively, adapted to receive electric light bulbs. The socket 21 is connected to the ordinary clutch switch, connected to the clutch pedal of the motor vehicle, the latter described elements not being shown on the accompanying drawing, as a means of illuminating the word "Stop", when the clutch pedal is disengaged. The socket 43, is connected to an ordinary switch positioned within easy reach of the operator of the motor vehicle, as a means of illuminating the translucent member 16, preferably of red color, so as to provide a rear light, such as required by law. The sockets 23 and 24 are similarly connected to switches, as a means of illuminating the designating arrows 19 and 20, as may be desired, when the motor vehicle is turned to the left or to the right.

The casing 10 has attached at its lower portion a plate member 25, provided with front and rear extended elements 26 and 27. The license plate 28 such as ordinarily required by law to designate or identify the motor vehicle, is secured, at its upper edge, to the front element 26 of the plate member 25, and extends downwardly therefrom. The numbers of the license plate 28 are preferably stenciled therein so as to permit the passage of light therethrough. The strap members 29 and 30, are secured to the rear element 27 and extend downwardly therefrom, positioned angularly thereto, so as to have their lower portions 31 and 32 parallel and adjacent to the lower portion of the license plate 28. The threaded members 33, bolts, screws or the like are provided with wing nuts 34, as a means of attaching the plate 35, to the lower portion of the strap members 29 and 30 and to the lower portion of the license plate 28. The plate 35 has affixed thereto, preferably stenciled therein, the name of the town or city, where the residence of the owner of the said motor vehicle is located.

The reflector member 36, is provided with formed or bent edges adapted to slidably engage in a similar reflector member 37, so as to permit the said reflector members 36 and 37, to be extended to a length corresponding to the length of the license plate 28. The reflector members 36 and 37, are provided with apertures 38 and 39, respectively, adapted to receive the threaded members 40, bolts, screws, or the like, as a means of attaching the reflector members 36 and 37, to the strap members 29, and 30. The above described construction is such as will provide a space 41, or opening between the lower portion of reflector members 36 and 37, and the plate 35, so as to permit the light from the electric light bulb 42, mounted on the socket 43, secured to the rear element 27, to be reflected through the said space 41, as a means of illuminating the plate 35. It is to be understood that the socket 43, is connected to a switch conveniently located near the driver of the motor vehicle. The socket 43, and the hereinbefore described sockets are connected to any convenient source of electric current such as a storage battery, or the like.

In Fig. 6 of the accompanying drawing, I have shown the license plate 28, provided with knocked out identification numerals and letters having raised edge boundaries, raised as at 28' from the license plate 28, so as to provide a more distinctive license plate, making the said identification numerals and letters visible in event dust, mud, snow, or the like should collect on same, the said raised portion 28', being preferably colored red, so as to more distinctly display the said numerals and letters.

In Figs. 7 and 8 of the accompanying drawing, I have shown the strap members 29 and 30, hinged as at 44, to the rear element 27. The strap members 29 and 30, have their sides formed or bent, so as to slidably receive the supplementary strap members 45 and 46, which are similarly formed so as to slidably engage therein. The turn buckles 51, are hinged, at one extremity, as at 49, to the supplementary strap members 45 and 46, and are secured to the clip members 31'. The clip members 32, as secured to the license plate 28, and to the plate 35, by the above mentioned threaded members 33, and the wing nuts 34. The above described construction being such as will permit the reflectors 36 and 37, to be held in any desired extended position by means of adjusting the turn buckles 51, so as to accommodate license plate of various lengths.

Having thus described my invention, what I claim as new and desire to protect by Letters Patent of the United States is as follows:

1. In combination with a vehicle tail light housing, a plate mounted on the bottom of said housing comprising front and rear downwardly depending extensions, a license plate having stenciled numerals therein mounted on said front extension, straps pivotally attached to the rear extension of said plate, an extensible reflector attached to said straps, an electric light bulb mounted on said rear extension adapted to emit light on said reflector, and adjustable means attached to the bottom of said reflector at one end and to the bottom of said license plate at the other end adapted to retain said reflector at a desired inclination to said license plate for directing rays of light from said electric light bulb through the stenciled numerals of said license plate.

2. In combination with a vehicle tail light housing, a plate mounted on the bottom of said housing comprising front and rear downwardly depended extensions, an electric bulb mounted on said rear extension, a perforated license plate mounted on said front extension, and an extensible reflector pivotally connected with said rear extension adapted to be extended to a length equal to the length of said license plate and to be pivotally adjusted for directing rays of light from said bulb through the perforations of said license plate.

3. In combination with a vehicle tail light housing, a plate mounted on the bottom of said housing comprising front and rear downwardly depended extensions, an electric bulb mounted on said rear extension, a perforated license plate mounted on said front extension, an extensible reflector pivotally connected with said rear extension adapted to be extended to a length equal to the length of said license plate and to be pivotally adjusted for directing rays of light from said bulb through the perforations of said license plate, and a turnbuckle attached at the lower edge to said license plate adapted to retain said reflector in an adjusted position.

4. In combination with a tail light casing, a plate mounted on the bottom of said casing comprising rear and front downwardly disposed extensions, a license plate having perforated numerals formed therein attached to said front extension, spaced apart pivotally mounted straps on said rear extension, telescoping reflector sections attached to said straps adapted to be extended for providing a reflector of a length equal to the length of said license plate, a bulb mounted in said rear extension adapted to emit light on said reflector, a second plate attached to the lower edge of said license plate having stenciled lettering therein, and a turnbuckle attached to the bottom portion of said reflector at one end and to said license plate at its other end adapted to retain said reflection at an inclination to said license plate for directing rays of light therethrough and to hold the bottom edge of said reflector in spaced relation to said license plate for permitting the passage of light rays therebetween to illuminate said second mentioned plate.

In testimony whereof I have affixed my signature.

JOHN KLAMER.